United States Patent [19]

Lang

[11] 4,345,184

[45] Aug. 17, 1982

[54] LIGHT FIBERS HAVING LENGTHS DETERMINED BY BEAM SCANNING TIME

[75] Inventor: Paul W. Lang, Long Beach, Calif.

[73] Assignee: Raymus K. Payton, Newport Beach, Calif.

[21] Appl. No.: 207,181

[22] Filed: Nov. 10, 1980

[51] Int. Cl.³ .................... H01J 29/10; H01J 29/89
[52] U.S. Cl. ............................................ 313/475
[58] Field of Search ..................................... 313/475

[56] References Cited

U.S. PATENT DOCUMENTS

| | | | |
|---|---|---|---|
| 3,141,106 | 7/1964 | Kapany | 313/475 |
| 3,459,466 | 8/1969 | Giordmaine | 350/356 |
| 3,684,346 | 8/1972 | Lang | 350/96.24 |
| 4,252,408 | 2/1981 | Parsons et al. | 313/475 |
| 4,311,357 | 1/1982 | Lang | 350/6.9 |

*Primary Examiner*—Robert Segal
*Attorney, Agent, or Firm*—Ralph B. Pastoriza

[57] ABSTRACT

The entrance ends of a plurality of optical fibers are arranged in a circular array and each provided with light emitting material in the form of phosphor responsive to impingement of an electron beam. The circular array of the fiber optic entrance ends is scanned by an electron beam so that the light emitters are successively triggered, the time for light to travel the difference between successive light paths defined by the optical fibers corresponding to the time of scan from one light emitting phosphor to the next adjacent light emitting phosphor so that individual pulses of light exit from the ends of said fibers substantially simultaneously.

1 Claim, 3 Drawing Figures

LIGHT FIBERS HAVING LENGTHS DETERMINED BY BEAM SCANNING TIME

This invention relates generally to electro-optical devices and more particularly to an electron beam responsive light integrating apparatus.

BACKGROUND OF THE INVENTION

U.S. Pat. No. 3,459,466 issued to J. A. Giordmaine on Aug. 5, 1969 describes an optical beam peak power amplifier and buncher.

Essentially, this patent teaches the concept of breaking up a light beam into spatially separated portions and thence subjecting the spatially separated portions to different delay times so that the same can be reassembled to all occur substantially at a single moment in time.

In my U.S. Pat. No. 3,684,346 issued Aug. 15, 1972 there is described an optical integrating system which accomplishes an integration of spatially and time separated light pulses into a single large pulse of light by utilizing a unique arrangement of fiber optics together with a special reflective crystal capable of generating progressively increasing annular rings of light.

In both of the foregoing systems, there is involved a "fly back" time in the scanning of the initial light beam in order to "break up" in a time and spatial sequence the light involved so that successive portions thereof can be delayed in such a manner that they will all add up at the output. For example, if a row of delay lines is provided, the light will successively impinge on the inlet ends of the delay lines until it reaches the last of the delay lines and then the light must be returned to its initial position; that is, scan back quickly to the first one of the delay lines and the process then repeated.

The same situation obtains in my above-mentioned U.S. patent wherein concentric rings of light are employed in the scanning operation. When the last or largest diameter ring is completed, the generating crystal must return to its initial state to commence a second succession of ever-expanding rings of light and it is during the return time that the light is wasted.

In my presently pending United States patent application Ser. No. 185,144 filed Sept. 8, 1980 and entitled Annular Scanning Light Pulse System, there is disclosed an improved apparatus for converting light into one or more output pulses of very high amplitude utilizing the principles set forth in the prior mentioned U.S. Patents but wherein there is no loss of light during any "flyback" time.

The foregoing is achieved by providing a series of light paths having individual light entrance ends and light exit ends, the light entrance ends being arranged in an annular or circular array. The lengths of the paths successively decrease from one path to the next adjacent path until the shortest path is reached which shortest path is immediately followed by the path of greatest length. A means for cylically sweeping a light beam such as a laser beam in a circular pattern is provided so that the angularly arranged light entrance ends of the paths can be sequentially scanned and in a cyclical or continuous manner over 360°.

The time for light to travel the difference between successive path lengths corresponds to the time of scan of the light beam from one light entrance opening or end to the next successive light entrance opening or end so that light passes from the light exit ends of the various light paths substantially simultaneously. Because of the annular or circular sweep pattern for the light beam, there is not involved any "flyback" time so that the maximum use is made of the initial light.

The success of my above-described system resides in being able to provide a mechanical means for causing the laser beam to scan a circular pattern at an extremely high frequency. While it is possible to provide extremely high speed motors for effecting the necessary scanning operation, an improvement could be achieved if other type scanning not involving mechanically moving parts could be realized.

BRIEF DESCRIPTION OF THE PRESENT INVENTION

With all of the foregoing in mind, the present invention contemplates provision of an annular scanning light pulse system which does not rely on purely mechanical means for effecting a scanning of the entrance ends of fiber optics in order to provide for high amplitude output pulses as described in my above-mentioned pending U.S. Patent application.

More particularly, in accord with the present invention, there is provided a light integrator which is responsive to an electron beam.

In its broadest aspect, the present invention contemplates the provision of a plurality of light paths having individual light entrance ends and light exit ends, the lengths of the paths successively decreasing from one path to the next adjacent path. Individual light emitting sources, in turn, are provided at the entrance ends, respecively, of the light path. Each of these sources is responsive to impingement of an electron beam thereon to emit light. An electron beam generator means is provided together with an electron beam deflecting means to cause the beam to successively scan the entrance ends of the light paths and thereby successively trigger the light emitters to emit light. The time for light to travel the difference between successive light paths corresponds to the time of scan from one light emitting source to the next adjacent light emitting source so that individual pulses of light pass from the exit ends of the paths substantially simultaneously.

The generation of successive light pulses is thus accomplished by means of a scanning electron beam wherein there are no mechanical moving parts, the scanning beam itself being capable of operation at extremely high frequency.

BRIEF DESCRIPTION OF THE DRAWINGS

A better understanding of this invention will be had by now referring to the accompanying drawings in which.

DETAILED DESCRIPTION OF THE INVENTION

Figure 1:
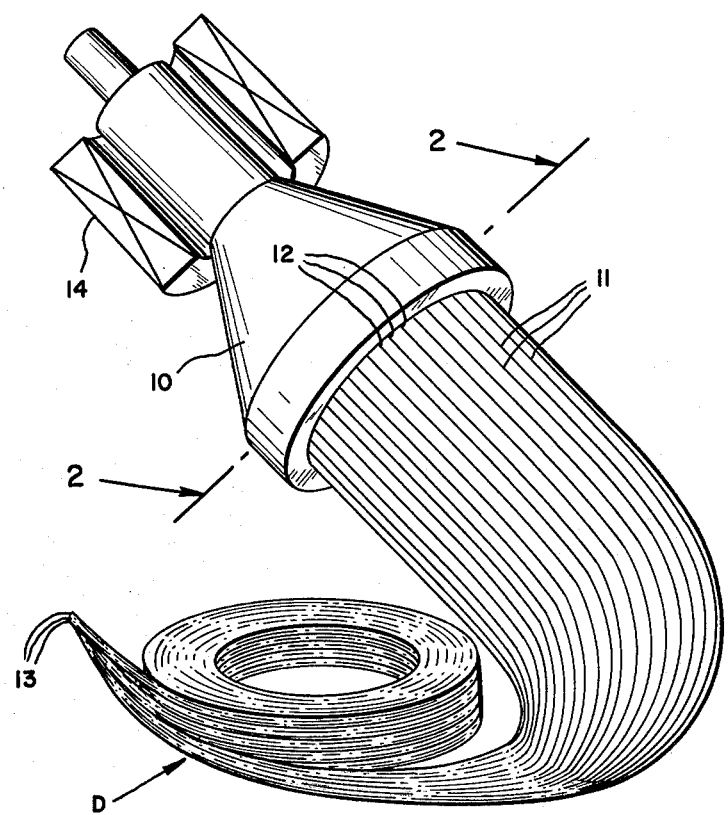
FIG. 1 is a highly schematic perspective view partly broken away of the electron beam responsive light integrator of this invention.

Referring first to FIG. 1, there is shown a cathode ray tube 10 having a front screen from which a plurality of optical fibers 11 extend. The entrance ends of the fibers 11 are indicated at 12 and actually pass through the front screen of the cathode ray tube to the interior thereof. The exit ends for the optical fibers are indicated at 13.

The various optical fibers 11 define a plurality of light paths of successively decreasing lengths from one path to the next adjacent path between the entrance and exit ends. The adjustment in the respective lengths of the fibers can be accomplished by individually spiralling the fibers in successively decreasing numbers of spiral paths schematically indicated at D in FIG. 1.

As will be described subsequently, individual light emitting sources are provided at the entrance ends 12 of the various optical fibers 11. These light emitting sources are responsive to impingement of an electron beam thereon to emit light. The cathode ray tube 10 accordingly houses an electron gun about which is an appropriate electron beam deflecting means indicated schematically at 14 to cause a circular beam pattern to be repeated at high frequency so that the entrance ends 12 of the fiber optics can be successively scanned by the electron beam.

Figures 2, 3:
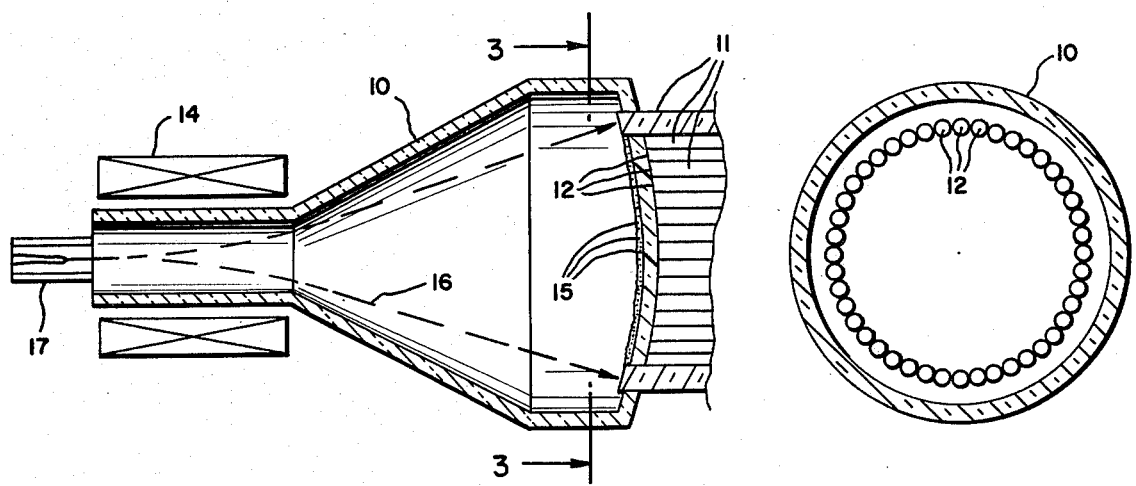
FIG. 2 is a fragmentary cross section taken in the direction of the arrows 2—2 of FIG. 1.
FIG. 3 is a cross section taken in the direction of the arrows 3—3 of FIG. 2.

The foregoing will be better understood by referring to FIG. 2 wherein the individual light emitting sources for the entrance ends of the fiber optics 11 are indicated at 15. Such light emitting material in the preferred embodiment of this invention takes the form of a phosphor such as yttrium-oxy-sulfide, doped with an activator such as praseodumium, available from U.S. Radium Corporation under the nomenclature GRE 3911. The chemical formula for this material is $Y_2O_2S:Pr$ and it will emit a bright green light of wave length from 500 to 510 nanometers. The decay time after the electron beam has left the phosphor is from 10 to 50 microseconds.

In FIG. 2 there is indicated by the dashed line 16 the annular scanning path of the electron beam. An appropriate electron gun is schematically indicated at 17 for emitting electrons which will pass through the deflecting means 14 towards the far right side of the cathode ray tube. An appropriate anode with high voltage applied thereto in the usual manner makes up part of the electron gun but is not shown in order to avoid obscuring the drawing.

Referring to the cross section of FIG. 3, the circular array of the entrance ends 12 of the various optical fibers on the screen of the cathode ray tube 10 will be evident. As shown in FIG. 2 and is previously described, the entrance end of the fibers preferably pass through the screen so as to be exposed to the vacuum inside the cathode ray tube 10. The phosphor material constituting the light emitting material is applied to the entrance ends of the fibers 12 so that the phosphor is subject to direct impingement by the scanning electron beam.

In operation, the movement of the electron beam is at a rate such that the time for light to travel the difference between successive light path lengths corresponds to the time of the scan to move from one light emitting source to the next adjacent light emitting source. As a consequence, the individual light pulses travelling the various light paths will arrive at the exit ends 13 described in FIG. 1 of the various fiber optical paths substantially simultaneously. In other words, the individual pulses emitted by the light emitters through one 360° annular sweep of the electron beam will all exit substantially simultaneously.

It should be understood, however, that only a portion of the circular array need be utilized before the pattern is repeated rather than the entire 360°. The various different combinations of delay lengths and the like do not constitute part of the present invention but are nevertheless fully set forth in my above referred-to copending patent application, the subject matter of which is incorporated herein by reference.

From all of the foregoing, it can now be appreciated that a light integrating system is provided responsive to an electron beam all to the end that mechanical moving parts are essentially eliminated and a very rapid scanning for the generation of high amplitude pulses can be realized.

I claim:

1. An electron beam-responsive light integrator including, in combination:
   (a) A plurality of optical fibers having individual light entrance ends and light exit ends, the lengths of said fibers successively decreasing from one to the next adjacent fiber;
   (b) individual light emitting sources comprising phosphor material secured to said entrance ends respectively, each of said sources being responsive to impingement of on electron beam thereon to emit light; and
   (c) a cathode ray tube including electron beam generating means for providing a beam of electrons, the entrance ends of the fibers being brought in through the screen surface of said cathode ray tube in a circular pattern, said cathode ray tube further including electron beam deflecting means functioning to cause the electron beam to scan in a circular array to thereby successively impinge on said phosphor materials to provide individual pulses of light, the time for light to travel the difference between successive fibers corresponding to the time of scan from one light emitting source to the next adjacent light emitting source, so that individual pulses of light pass from the exit end of said fibers substantially simultaneously.

* * * * *